United States Patent
Stillman et al.

[11] 3,728,750
[45] Apr. 24, 1973

[54] METHOD OF FABRICATING SCREW FASTENERS

[75] Inventors: Donald W. Stillman, Playa Del Rey; Mansour A. H. Bagheri, Los Angeles, both of Calif.

[73] Assignee: Long-Lok Fasteners Corporation, Cincinnati, Ohio

[22] Filed: Mar. 3, 1971

[21] Appl. No.: 120,462

[52] U.S. Cl. ................................10/10 R, 151/14
[51] Int. Cl. ................................................B23g 9/00
[58] Field of Search ................10/10, 27, 27 FS, 10/27 PH, 86, 86 F; 151/14, 22, 31

[56] References Cited

UNITED STATES PATENTS

| | | | |
|---|---|---|---|
| 2,542,023 | 2/1951 | Friedman | 10/86 F |
| 2,637,361 | 5/1953 | Nagel | 151/14 |
| 2,844,830 | 7/1958 | Evans | 10/10 R |
| 2,856,617 | 10/1958 | Widmann | 10/10 R |
| 3,227,199 | 1/1966 | Mount | 151/14 |
| 3,245,096 | 4/1966 | McKay et al | 10/10 R |
| 3,419,928 | 1/1969 | Gabbey | 10/10 R |

FOREIGN PATENTS OR APPLICATIONS

| | | | |
|---|---|---|---|
| 334,413 | 1/1959 | Switzerland | 151/31 |
| 1,028,250 | 4/1958 | Germany | 10/10 R |

Primary Examiner—Charles W. Lanham
Assistant Examiner—E. M. Combs
Attorney—Smyth, Roston & Pavitt

[57] ABSTRACT

To fabricate a hollow-end screw having a thin circumferential wall with radial protuberances for self-locking action, the tendency for cracks to develop in one location is avoided in part by thickening the circumferential wall and in part by eliminating a sharp corner at an intermediate fabrication stage. The tendency for cracks to develop in a second location on the screw is avoided by eliminating a sharp corner in the final configuration of the screw.

10 Claims, 12 Drawing Figures

Patented April 24, 1973

INVENTORS:
Mansour A. H. Bagheri
Donald W. Stillman

Smyth, Roston & Pavitt
ATTORNEYS

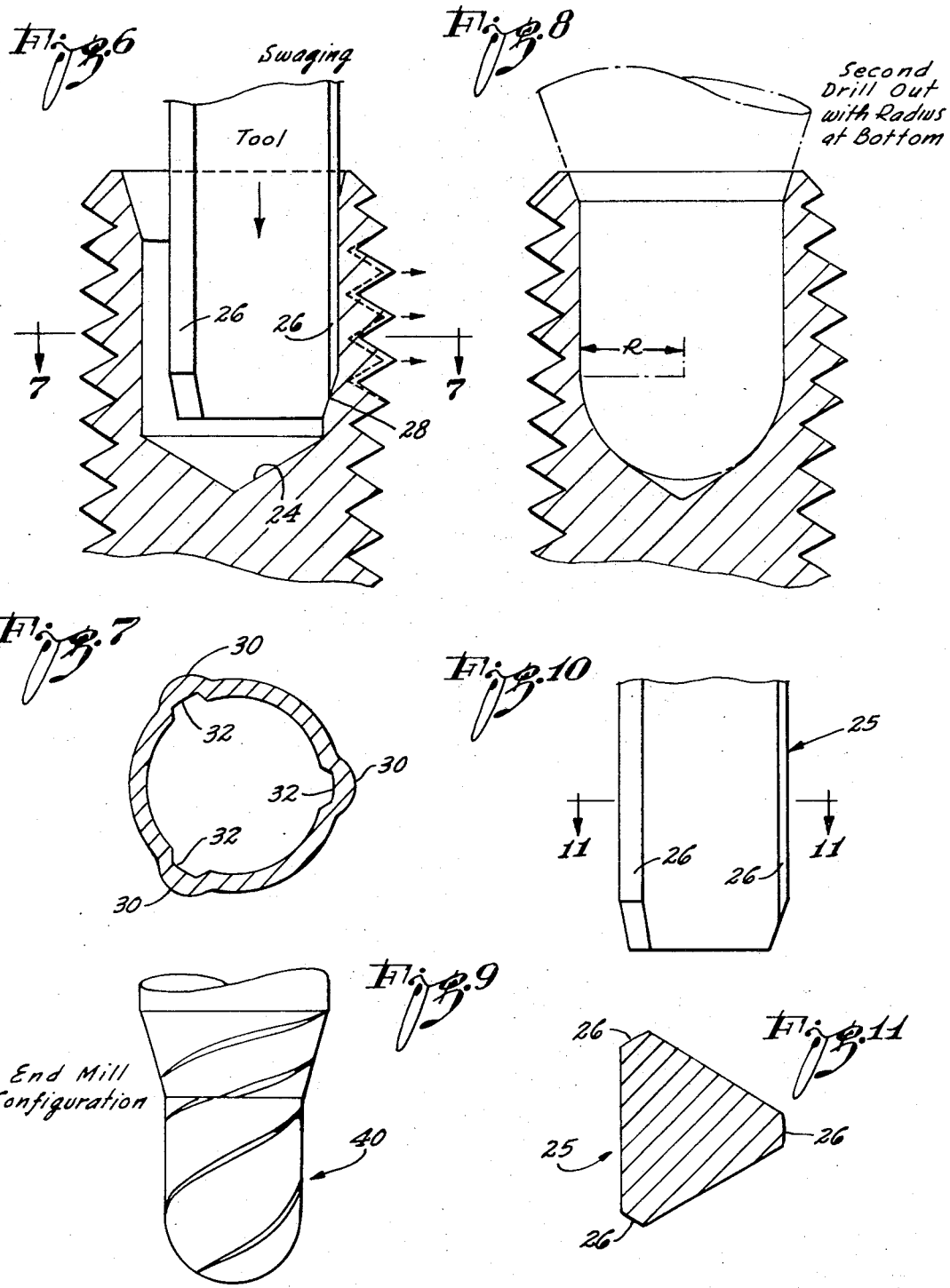

METHOD OF FABRICATING SCREW FASTENERS

BACKGROUND OF THE INVENTION

Self-locking screws have been produced commercially by a fabrication process disclosed in the co-pending Bagheri application Ser. No. 8,454, the finished product being a hollow-end screw with a thin circumferential wall that is formed with circumferentially spaced radial protuberances for self-locking action. Such screws have been completely successful when made of grades of steel that are commonly used for screws.

When the screws are made of high heat treat alloys that have a low elongation, however, cracks tend to develop in two regions on the screws. One of the regions is at the bottom of the blind bore and the second region is at an intermediate location along the length of the axial bore.

A definite need exists for elimination of these cracks to make it possible to fabricate completely satisfactory screws of high heat treat alloys and other metals that have low elongation.

SUMMARY OF THE INVENTION

It has been found that the cause of cracks tending to develop in the first region at the bottom of the blind bore of a high heat treat alloy is that a sharp corner exists at the transition between the cylindrical side wall of the bore and the conical bottom wall of the bore. Accordingly, the invention eliminates this sharp corner by providing a smooth, curved transition from the side wall to the bottom wall.

The cause of the cracks in the second region that is between the two ends of the blind bore is not readily apparatus because the inner wall of the finished bore is smooth and of uniform diameter. In this respect the invention is based on the discovery of the cause of the cracks in the second region as well as the concept of how to eliminate the cause.

The cause of the cracks in the second region on the screw has been traced to an intermediate stage in the fabrication procedure where a swaging punch is initially advanced against a conical inner circumferential shoulder of a preliminary blind bore in the screw. The cause of the cracks in this second region is attributable, in part, to a relatively sharp corner at the base of the conical shoulder and is attributable in further part, to the fact that the circumferential wall of the screw is relatively thin in the region of the conical shoulder.

The cause of the cracks in this second region is eliminated by changing the configuration of the preliminary blind bore. In the above mentioned co-pending disclosure the preliminary blind bore that exists during an early stage in the fabrication procedure is of stepped configuration, a cylindrical entrance of uniform inside diameter terminating in a conical inner circumferential shoulder than, in turn, leads to an inner end portion of the bore that is of reduced uniform diameter.

In the present invention the preliminary bore is of a new configuration in which the entrance to the preliminary bore is conical at a relatively long taper instead of the entrance being of stepped configuration. The long taper of the entrance to the preliminary bore not only eliminates the sharp corner in this region but in itself also increases the thickness of the circumferential wall in the region where cracks tend to occur.

In the preferred practice of the invention, the inside diameter of the inner end portion of the preliminary bore is reduced from the previous inside diameter with two consequences that are important for the purpose of the invention. One consequence is simply that the circumferential wall of the tubular end of the screw is thickened by reason of the reduced inside diameter and therefore the circumferential wall has greater capacity to withstand the stress created by the swaging operation. The second consequence which is closely related to the first consequence is that the thicker wall provides more room for flow of the metal that is displaced by the circumferentially spaced longitudinal lands of the swaging punch.

The features and advantages of the invention may be understood from the following detailed description and the accompanying drawings.

BRIEF DESCRIPTION OF THE DRAWINGS

In the drawings, which are to be regarded as merely illustrative:

FIG. 6 is a view similar to FIG. 5 showing how the advance of the swaging punch into the preliminary bore converts the bore of preliminary configuration into a bore of intermediate configuration and in doing so creates the radial protuberances of the screw;

FIG. 7 is a transverse view along the lines 7—7 of FIG. 6 with the swaging punch omitted, the view showing the configuration in cross section of the blind bore of intermediate configuration at this stage in the fabrication procedure;

FIG. 8 is a fragmentary sectional view showing how a special drill is employed to change the blind bore of intermediate configuration into a blind bore of the final configuration;

FIG. 9 is a fragmentary elevational view of a tool that is employed to make the preliminary bore that is shown in FIG. 5;

FIG. 10 is a fragmentary side elevational view of the swaging punch that is shown in FIGS. 5 and 6; and FIG. 11 is a cross section of the swaging punch taken along the line 11—11 of FIG. 10.

DESCRIPTION OF THE PREFERRED EMBODIMENT OF THE INVENTION

Figure 1:
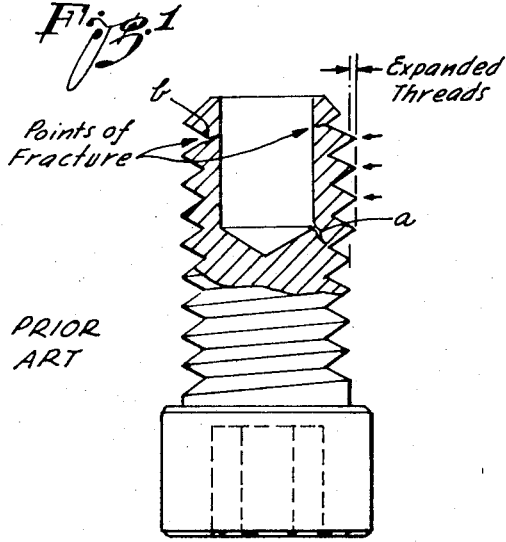
FIG. 1 is a side elevation, partly in section, showing the finished prior art screw disclosed in the above mentioned pending Bagheri et al application.

FIG. 1 shows the final configuration of a screw as produced by the method disclosed in the previously mentioned co-pending Bagheri et al. application.

The problem to which the present invention is directed is that in a screw made of high heat treat alloy cracks designated *a* in FIG. 1 tend to develop near the bottom end of the bore and other cracks designated *b* tend to develop at an intermediate point along the length of the cylindrical inner wall of the bore. In the course of the prior fabrication procedure a swaging punch with circumferentially spaced longitudinal swaging lands is driven into an end bore of a preliminary configuration to convert the bore to an intermediate configuration with consequent formation of the radial protruberances and finally a conventional twist drill is employed to produce the final bore configuration in FIG. 1.

Figure 2:
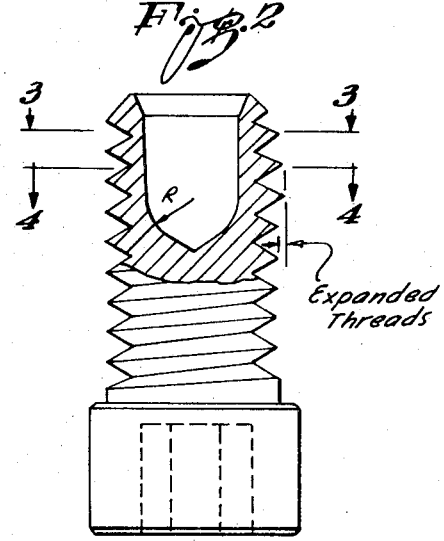
FIG. 2 is a similar view of a screw that embodies the present invention.
Figure 3:
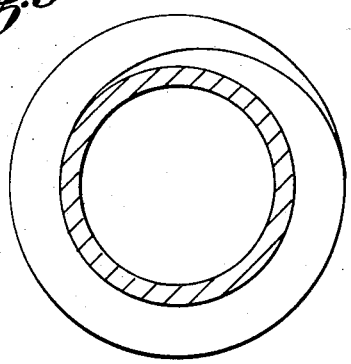
FIG. 3 is a transverse section along the line 3—3 of FIG. 2.
Figure 4:
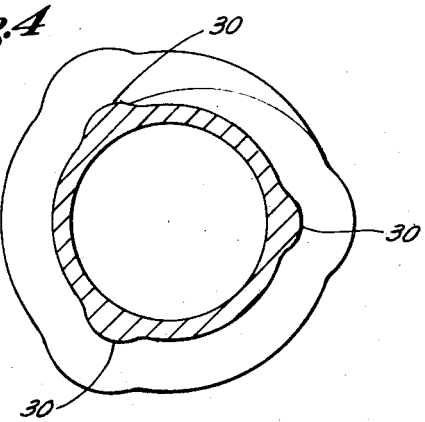
FIG. 4 is a transverse section along the line 4—4 of FIG. 2.
Figure 5:
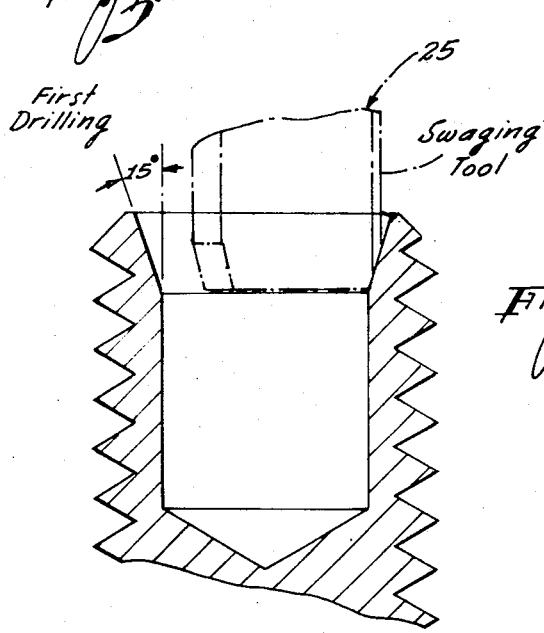
FIG. 5 is a fragmentary sectional view of the screw at an intermediate stage in its fabrication showing the configuration of the preliminary blind bore with a swaging punch shown in phantom for expanding the preliminary bore.

FIGS. 2, 3 and 4 show the configuration of a screw fabricated in accord with the teachings of the present invention and FIGS. 5, 6 and 8 illustrate successive stages in the production of the new screw.

FIG. 5 shows the preliminary configuration of the end bore which is characterized by a tapered entrance 20 of the substantial axial dimension which leads to a uniform cylindrical inner circumferential wall 22 which, in turn, terminates at a conical bottom wall 24. It is apparent that the preliminary bore configuration shown in FIG. 5 may be formed by first employing a conventional twist drill to form the major portion of the bore and then by reaming the outer end of the bore to form the tapered entrance 20. In the preferred practice of the invention, however, the preliminary bore is made in a single operation by a drill shown in FIG. 9, the profile of the drill conforming to the longitudinal cross-sectional configuration of the preliminary end bore. Preferably the taper of the entrance is approximately 15 degrees as indicated in FIG. 5.

The next operation is to employ a swaging punch 25 of a configuration shown in FIGS. 10 and 11 in the general manner of the prior art to expand the cylindrical wall of the initial groove in three circumferentially spaced longitudinal regions. The swaging punch 25 may be of any suitable non-circular cross-sectional configuration and in this instance the swaging punch is of generally triangular cross-sectional configurations with three circumferentially spaced lands. Each land is of rounded cross section along its outer face as shown in FIG. 11 and each land is beveled at its leading end to form an inclined leading face 28.

The swaging punch 25 is initially positioned at the tapered entrance 20 of the preliminary bore as may be understood from FIG. 5 where the swaging punch is shown in phantom. As the swaging punch 25 advances and approaches the conical bottom wall 24 of the preliminary bore, as shown in FIG. 6, each of the three lands 26 of the punch displaces the corresponding longitudinal portion of the circumferential wall of the end bore radially outward as indicated by the arrows in FIG. 6. The result is that the preliminary bore configuration shown in FIG. 5 is converted to the intermediate configuration shown in FIG. 7, the intermediate configuration being characterized by three radial protuberances 30 and three corresponding longitudinal recesses 32 in the inner circumferential wall of the bore.

Figure 5A:
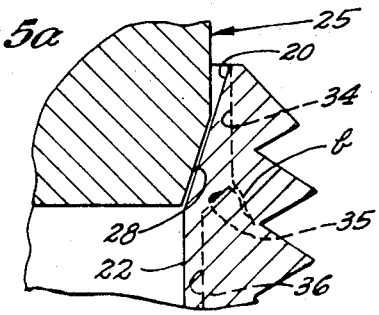
FIG. 5a is an enlarged portion of FIG. 5 indicating how the new configuration of the preliminary bore compares to the old configuration.

The difference in configuration between the preliminary bore configuration in the fabrication of the new screw and the preliminary bore configuration in the fabrication of the prior screw may be understood by reference to FIG. 5a which is a fragment of FIG. 5. The dotted line in FIG. 5a shows by way of contrast the configuration of the preliminary bore in the fabrication of the prior art screw. As may be seen in FIG. 5a the prior preliminary bore configuration is characterized by a cylindrical entrance 34 which leads to a tapered inner circumferential shoulder 35 which provides a transition to a smooth inner circumferential wall 36 which corresponds to the inner wall 22 of the new preliminary bore configuration.

The wavy line in FIG. 5a designates one of the previously mentioned cracks *b* and it can be seen that the crack originates at the relatively sharp corner at the juncture between the cylindrical entrance 34 and the tapered inner circumferential shoulder 35 of the prior configuration of the preliminary bore. It has been further discovered that a contributing factor is that the circumferential wall of the prior art screw is relatively thin in the region of the sharp corner between the cylindrical entrance 34 and the tapered shoulder 35. In FIG. 5a it is apparent that the tapered entrance 20 of the improved preliminary bore not only eliminates the sharp corner where the crack *b* originates but also increases the thickness of the cylindrical wall of the screw to avoid the contributing factor.

It is also apparent in FIG. 5a that the inside diameter of the inner cylindrical wall 22 of the new preliminary bore configuration is smaller than the inside diameter of the cylindrical wall 36 of the prior preliminary bore configuration and that this reduction in inside diameter further increases the thickness of the circumferential wall in the region of the crack *b* to avoid the above mentioned contributing factor.

It is also to be noted in FIG. 5a that the inclination of the leading faces 28 of the longitudinal lands of the swaging punch 25 conform to the inclination of the tapered entrance 20 of the new preliminary end bore. Thus, the tapered entrance 20 provides a relatively long tapered shoulder at a relatively low taper angle and each of the leading faces 28 of the swaging punch makes contact with relatively large area of the tapered shoulder to result in relatively low unit pressure of the swaging punch against the metal of the screw. In contrast the relatively short and relatively steep tapered inner circumferential shoulder 35 of the prior preliminary end bore configuration inherently results in relatively high unit pressure by an advancing swaging punch. These new relationships also important in elimination of the cracks *b*.

In the prior art procedure a conventional twist drill is employed to convert an intermediate end bore of the cross-sectional configuration shown in FIG. 7 to the final end bore cross-sectional configuration shown in FIG. 1. The present invention teaches, however, the use of a special drill indicated by numeral 40 in FIGS. 8 and 9 for the final boring operation. The special drill 40 conforms in profile to the longitudinal cross-sectional configuration of the final configuration of the end bore that is shown in FIG. 2. With the inner longitudinal recesses 32 eliminated by the final boring operation, the cross-sectional configuration of the screw is of the character shown in FIG. 4 wherein three circumferentially spaced radial protuberances 30 are local enlargements in the thickness of the circumferential wall.

In FIG. 4 the three enlargements are along a valley between two turns of the external screw thread but it can be seen that the crest of the screw thread also protrudes in the three circumferentially spaced regions.

The important fact about the final end bore configuration shown in FIG. 2 and 8 is that the sharp circumferential corner at the bottom of the prior preliminary bore shown in dotted lines in FIG. 5a is eliminated entirely and, instead, the transition from the cylindrical inner wall of the bore in FIG. 8 to the bottom of the bore is of rounded configuration with no sharp corner whatsoever. Preferably the transition region at the bottom of the bore is of spherical curvature with the center of the curvature on the longitudinal axis of the bore. Thus the transition surface conforms to the surface of a sphere of the same radias R as the final bore and in this instance the arcuate extent of the spherical curvature as viewed in FIG. 8 is approximately 30°. It is to be further noted that by virtue of the long tapered entrance 20 of the preliminary bore shown in FIG. 5 the final boring operation results in a short tapered entrance 42 to the final end bore shown in FIG. 8. This thinning of the entrance of the final end bore configuration has a useful effect in locally increasing the resiliency of the circumferential wall of the end bore for improved self-locking action.

Our description in specific detail of presently preferred practice of the invention will suggest various changes, substitutions and other departures from our disclosure within the spirit and scope of the appended claims.

We claim:

1. A method of forming an all-metal self-locking screw in which a longitudinal bore within the screw is selectively enlarged to form longitudinal protuberances in the threaded portion of the screw, said method comprising:

forming a longitudinal blind preliminary bore in the leading end of the screw with said preliminary bore having a cylindrical portion having a given inner diameter, an entrance having a larger diameter than the diameter of the cylindrical portion, and a tapered entrance surface leading directly from the entrance to the cylindrical portion;

expanding the preliminary bore of the screw by inserting a swaging punch into the preliminary bore with said swaging punch having circumferentially spaced lands which expand the portions of the preliminary bore that are contacted by the spaced lands to form longitudinal recesses in the wall of the preliminary bore and corresponding circumferentially spaced outer longitudinal protuberances in the threaded portion of the screw;

said punch being inserted into the preliminary bore to make its initial contact with the bore by contacting the tapered entrance surface between the bore entrance and the cylindrical portion of the preliminary bore; and reboring the preliminary bore to form a final bore configuration by eliminating the longitudinal recesses in the wall of the bore.

2. The method of claim 1 in which the longitudinal lands of the punch have leading end faces of the same taper as the tapered entrance surface of the preliminary bore.

3. The method of claim 1 in which the reboring of the screw to produce the final bore configuration is carried out by a boring tool having a rounded leading end to avoid forming a sharp corner at the bottom of the final bore configuration and to thereby eliminate the tendency for cracks to occur at the bottom of the final bore configuration.

4. The method of claim 3 in which said boring tool has a nose with a spherically curved shoulder to cause the final bore configuration to have a spherically curved annular surface at its bottom end.

5. The method of claim 4 in which the radius of curvature of the curved shoulder of the boring tool is substantially equal to the radius of the boring tool whereby the curvature of the spherically curved annular surface of the final bore conforms to the curvature of a sphere having the same diameter as the final bore configuration.

6. The method of claim 5 in which said spherically curved annular shoulder in a longitudinal cross section has an arcuate extent of approximately 30°.

7. The method of claim 1 where the inner diameter of the cylindrical portion of the preliminary bore is sufficiently small to provide a relatively thick wall between the preliminary bore and the threaded portion of the screw both at the juncture of the cylindrical portion of the bore with the tapered entrance surface and also in the region of the wall where the inner longitudinal recesses and outer longitudinal protuberances are formed, whereby the formation of cracks in the screw during enlargement of the preliminary bore is reduced.

8. The method of claim 7 in which the reboring of the screw to produce the final bore configuration is carried out with a boring tool having a rounded leading end to eliminate formation of a sharp corner at the bottom of the final bore configuration and to thereby eliminate the tendency for cracks to occur at the bottom the final bore configuration.

9. The method of claim 8 in which said boring tool has a nose with a spherically curved shoulder to cause the final bore configuration to be formed with a spherically curved annular surface at its bottom end.

10. The method of claim 9 in which the radius of curvature of the curved shoulder of the boring tool is substantially equal to the radius of the boring tool whereby the curvature of the spherically curved annular surface of the final bore configuration has the spherical curvature of a sphere having the same diameter as the diameter of the final bore configuration.

* * * * *